(12) United States Patent
Vermeulen et al.

(10) Patent No.: US 10,758,320 B2
(45) Date of Patent: Sep. 1, 2020

(54) TEETH ILLUMINATION DEVICE

(71) Applicant: KONINKLIJKE PHILIPS N.V., Eindhoven (NL)

(72) Inventors: Olaf Thomas Johan Antonie Vermeulen, OSS (NL); Pascal Jean Henri Bloemen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/330,978

(22) PCT Filed: Mar. 21, 2018

(86) PCT No.: PCT/EP2018/057096
§ 371 (c)(1),
(2) Date: Mar. 6, 2019

(87) PCT Pub. No.: WO2018/177832
PCT Pub. Date: Oct. 4, 2018

(65) Prior Publication Data
US 2020/0008904 A1    Jan. 9, 2020

Related U.S. Application Data

(60) Provisional application No. 62/476,916, filed on Mar. 27, 2017.

(30) Foreign Application Priority Data

Jun. 2, 2017   (EP) ...................................... 17174209

(51) Int. Cl.
*A61C 1/08*    (2006.01)
*A61C 19/06*   (2006.01)

(52) U.S. Cl.
CPC ............ *A61C 1/088* (2013.01); *A61C 19/066* (2013.01)

(58) Field of Classification Search
CPC .... A61C 19/066; A61C 19/003; A61C 19/004
See application file for complete search history.

(56) References Cited

U.S. PATENT DOCUMENTS 6,932,599 B1 *  8/2005  Hartung ............... A61C 19/004
                                                 362/800
6,940,659 B2 *  9/2005  McLean ............... A61C 19/004
                                                 359/709

(Continued)

FOREIGN PATENT DOCUMENTS

CN       103610464       3/2014
WO    2006020128 A2    2/2006

(Continued)

*Primary Examiner* — Ralph A Lewis

(57) ABSTRACT

The invention relates to a mouthpiece (100) for illumination of teeth, e.g. for teeth whitening. The mouthpiece is configured with at least two lenses (102a, 102b) shaped to cast asymmetrical light onto the teeth (110). The lenses are arranged one-to-one with associated light sources (101a, 101b). The first and second lenses are arranged to project the received light onto a buccal side (111) of the teeth (110), and each of the first and second lenses has an asymmetrically shaped refraction surface (301) shaped to change an intensity distribution of the received light asymmetrically on opposite sides of an optical axis (121) of the respective light source along the dental arch (201) of the teeth.

15 Claims, 5 Drawing Sheets

(56) References Cited

U.S. PATENT DOCUMENTS

| | | | |
|---|---|---|---|
| 8,382,472 B2* | 2/2013 | Plank | A61C 19/004 |
| | | | 362/120 |
| 9,907,636 B2* | 3/2018 | Yun | A61C 19/003 |
| 2002/0005475 A1 | 1/2002 | Zenzie | |
| 2005/0243570 A1 | 11/2005 | Chaves et al. | |
| 2006/0134576 A1 | 6/2006 | West | |
| 2009/0142724 A1 | 6/2009 | Rosenblood et al. | |
| 2016/0271415 A1 | 9/2016 | Min | |

FOREIGN PATENT DOCUMENTS

| | | |
|---|---|---|
| WO | 2009045223 A1 | 4/2009 |
| WO | 2016066370 A1 | 5/2016 |

* cited by examiner

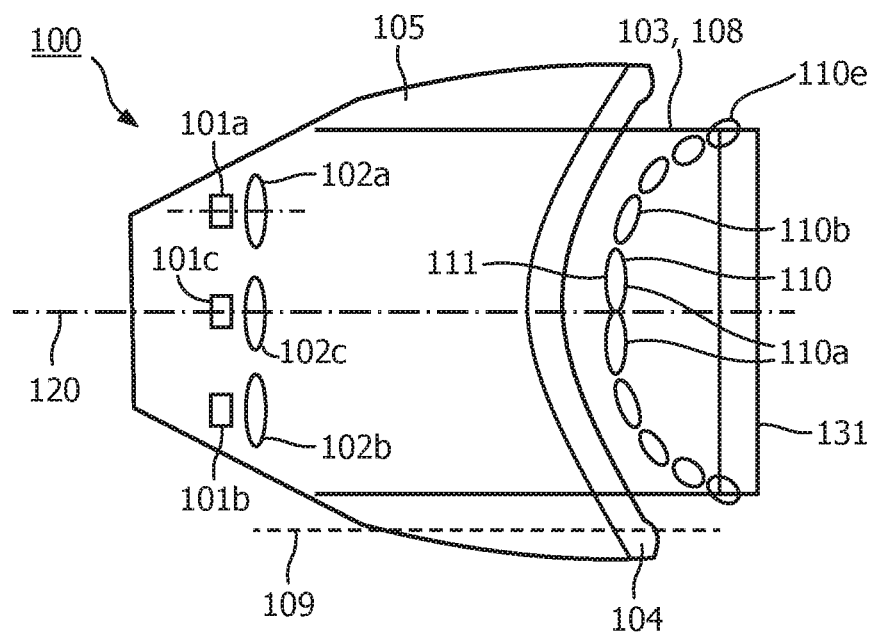

TEETH ILLUMINATION DEVICE

CROSS-REFERENCE TO PRIOR APPLICATIONS

This application is the U.S. National Phase application under 35 U.S.C. § 371 of International Application No. PCT/EP2018/057096, filed on Mar. 21, 2018, which claims the benefit of U.S. Provisional Patent Application No. 62/476,916, filed on Mar. 27, 2017 and European Patent Application No. 17174209.1, filed on Jun. 2, 2017. These applications are hereby incorporated by reference herein.

FIELD OF THE INVENTION

The invention relates to teeth illumination devices and to oral care or hygiene devices such as teeth whitening devices.

BACKGROUND OF THE INVENTION

Oral care devices such as teeth whitening devices use light for illuminating the teeth. The light can be used for different purposes including teeth whitening in combination with a whitening gel or varnish, plaque or bacteria hygiene by use of disinfecting UV light or other purposes.

WO 2016/066370 A1 discloses a smart lighting system for applying light to teeth in the context of tooth whitening. This particularly concerns teeth that have been provided with a light-curable whitening varnish. The system comprises a light-generating unit, a light-patterning unit, a mouth imaging unit, a mouth image sensing unit, and an image processing and control unit, and is adapted so as to allow the image processing and control unit to adjust the light-patterning unit on the basis of information obtained from the mouth image sensing unit. By doing so, prior to allowing the light-generating unit to emit light, it can be ensured that light emitted to assist tooth whitening, does not affect soft tissue.

SUMMARY OF THE INVENTION

It would be advantageous to achieve an oral device capable of improving generation of a uniform light intensity at the teeth, alternatively or additionally capable of reducing heating of the teeth. The invention is defined by the independent claims. The dependent claims define advantageous embodiments.

To better address one or more of these concerns, in a first aspect of the invention a mouthpiece for teeth illumination is presented that comprises:
first and second light sources, and
a first lens arranged to receive light from the first light source and a second lens arranged to receive light from the second light source, where the first and second lenses are arranged to project the received light onto a buccal side of the teeth, and where each of the first and second lenses has an asymmetrically shaped refraction surface shaped to change an intensity distribution of the received light asymmetrically on opposite sides of an optical axis of the respective light source along the dental arch of the teeth.

Advantageously, the asymmetrically shaped refraction surfaces of the lenses makes is possible to achieve different intensity profiles on the left and right sides of the optical axis of the lenses. In this way, a range of overlap which receives light from both light sources can be established. Furthermore, the asymmetrically shaped refraction surfaces may be arbitrarily shaped as freeform lenses to achieve a desired intensity distribution in order to achieve a uniform intensity distribution at the teeth.

The lenses are asymmetrical in the sense that the intensity of the received light is modified asymmetrically into the projected light on opposite sides of the optical axis of the light source along the dental arch of the teeth, i.e. in an occlusal plane of the mouthpiece.

Advantageously, the use of projection lenses makes it possible to locate the light sources, e.g. light emitting diodes, at a distance from the teeth. Accordingly, radiation heat from the light sources causes less heating of the teeth and gums compared to light sources located close to the teeth. The lower heating makes it possible to use a higher light intensity without generating heat which could cause discomfort or even damage the pulp in the pulp chamber of the teeth.

It is understood that the mouthpiece may comprise two or more light sources and two or more associated lenses. For practical reasons, the two or more lenses may be in the form of a one-piece body moulded or shaped from a single material. Accordingly, it is understood that two or more lenses formed as a single lens-component is equivalent to two or more separate lenses.

According to an embodiment, the mouthpiece comprises a distance member arranged to contact a part of a mouth-region of the user, when in use, to establish a distance between the first and second lenses and the buccal side of the teeth as defined by the distance member. Advantageously, the distance member ensures the that distance from the lenses to the teeth are close to the optimal projection distance of the lenses required for obtaining the desired intensity profiles which the lenses have been designed to generate.

According to an embodiment, the distance member is arranged so that the first and second light sources are located in front of the face of the user when the mouthpiece is used. Advantageously, due to the separation of the light sources from the face, heating of the teeth and mouth-region is reduced compared to a solution where the light sources are arranged closer to the teeth.

According to an embodiment, the first and second light sources are arranged on either side of a facial midline, when the mouthpiece is used, where the facial midline defines a line between left and right incisors of the user. Advantageously, by arranging the light sources to the left and right of the facial midline, a larger number of teeth can be illuminated with uniform light.

According to an embodiment, the first and second lenses are arranged to project the received light so that the intensity of the projected light at the buccal side of the teeth at the facial midline consist of light from the first and second light sources. Advantageously, by combining light from both light sources at a part of the dental range, the transition from teeth illumination from one light source to another light source can be made smooth.

According to an embodiment, the first and second lenses are arranged to project the received light so that a part the buccal side of the teeth a distance away from the facial midline is illuminated only by light from one of the first and second light sources. Advantageously, due to the asymmetrical lighting, left and right sides of the dental arch can be illuminated individually by uniformly shaped light.

According to an embodiment, the first and second lenses are arranged to project the received light so that the intensity of the projected light from each one of the first and second light sources gradually decreases along a dental arch towards the facial midline. Advantageously, due to the gradual decrease in light intensity the light from two neighbor light sources can be combined to generate a substantially uniform or constant light intensity.

According to an embodiment, the mouthpiece comprises a third light source and a third lens arranged to receive light from the third light source, where the third light source is arranged between the first and second lenses to project the received light onto the buccal side of the teeth, where the third lens has a symmetrically shaped refraction surface. Advantageously, use of a third light source may facilitate one or more of generating higher light intensity, illuminating a larger number of teeth with uniform light and improving the uniformity of projected light.

According to an embodiment, the first, second and third lenses are arranged to project light from the first, second and third light sources so that the intensity of the projected light at the buccal side of the teeth from the first and third light sources overlap at a first portion of the dental arch and so that the intensity of the projected light at the buccal side of the teeth from the second and third light sources overlap at a different second portion of the dental arch.

According to an embodiment, the mouthpiece comprises a housing with a wall structure, where an end region of the wall structure comprises a contact part arranged to contact the gums of the user. Advantageously, the wall structure with the contact part provides a fixed distance between the mouth-region and the lenses so that that an optimal distance between teeth and lenses can be achieved for obtaining a uniform intensity.

The wall structure may form a tube or funnel shaped wall with an at least partial empty interior. The wall structure may have openings to provide convection cooling. The wall structure may have the form a grid or other open structure. The wall structure may be formed by shells, pins, bars, meshed surfaces or combinations thereof and from materials like silicone, plastic, metal or other similar material.

Advantageously, the wall shaped structure enables an open structure of the mouthpiece. The open structure may advantageously be used together with varnish substances on the teeth, e.g. for whitening purposes, since varnish substances does not require a sealing structure as may be required for holding teeth gels in place. Furthermore, the open structure improves heat dissipation so that higher intensity levels may be achieved.

According to an embodiment, the mouthpiece comprises a sealing structure arranged for retaining an applied dental substance within a space defined by the sealing structure and the buccal side of the teeth, where the sealing structure comprises the contact part. Advantageously, the sealing structure is designed to help keeping the dental substance in place between the teeth and the transparent window of the mouthpiece. For example, the mouthpiece may be a teeth-whitening mouthpiece and the dental substance may be a teeth-whitening gel.

According to an embodiment the housing comprises at least one through-hole arranged in the wall between the contact part and the at least one light source. Advantageously, holes in the housing improves heat dissipation.

According to an embodiment, the mouthpiece comprises a holding member connected to the housing, where the holding member is arranged to enable the user to hold the mouthpiece by a force applied to the holding member via an occlusal surface of one or more of the teeth. Advantageously, the holding member enables holding of the mouthpiece only by use of the teeth so that the user is free to use her hands during the illumination process.

According to an embodiment, the mouthpiece comprises an adjustable diaphragm arranged to adjust an extension of the projected light in a direction perpendicular to the occlusal plane of the mouthpiece. Advantageously, the diaphragm enables adjustment so that the projected light substantially only illuminates the teeth, but not the gums.

A second aspect of the invention relates to the use of a mouthpiece according to the first aspect for teeth illumination which comprises the steps of:

arranging the mouthpiece so that a part of the mouthpiece contacts a part of a mouth-region of the user to establish a distance as defined by the mouthpiece between the first and second lenses and the buccal side of the teeth, and illuminating the teeth by light projected by the first and second lenses onto the teeth of the user.

An embodiment of the invention relates to a mouthpiece for illumination of teeth, e.g. for teeth whitening. The mouthpiece is configured with at least two freeform lenses shaped to cast light asymmetrical onto the teeth. The lenses are arranged one-to-one with associated light sources. The lenses are shaped so that the asymmetrical light from the at least two lenses combine over an area of the teeth, e.g. across first and second central incisors. In order to achieve uniform illumination over the dental arch, the lenses may project light which has a uniform intensity distribution at the left and right sides of the dental arch and which has a decreasing intensity towards the facial midline between the central incisors so that the combination of decreasing intensities combine to generate a uniform intensity over the range where the decreasing intensities overlap.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which

FIG. 6 shows an embodiment of the mouthpiece with three light sources and lenses.

DESCRIPTION OF EMBODIMENTS

Figure 1A:
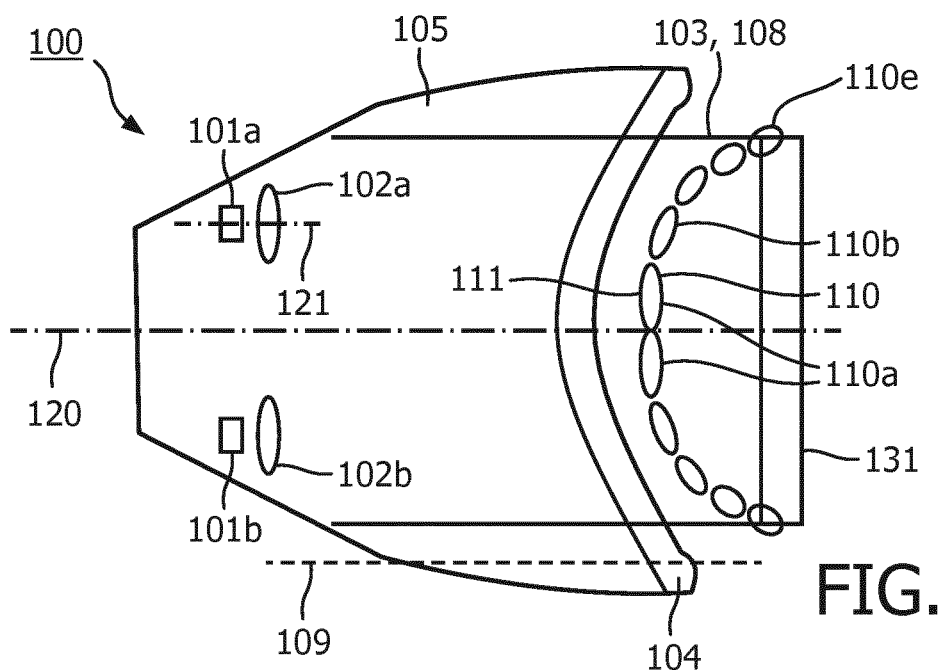
FIGS. 1A, 1B and 1C illustrate different views of an embodiment of a mouthpiece for use as a teeth illumination device.
Figure 1B:
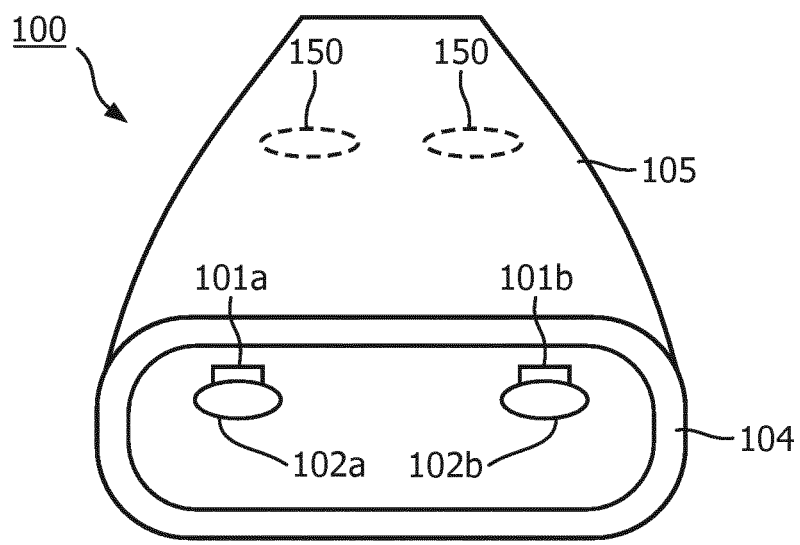
Figure 1C:
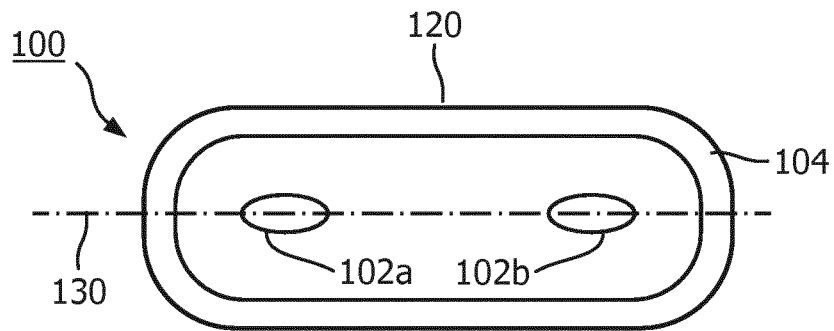

FIGS. 1A, 1B and 1C illustrate an embodiment of a mouthpiece 100 for use as a teeth illumination device. The teeth of a user may be illuminated for the purpose of teeth whitening, plaque or bacteria hygiene, or other oral hygiene or care uses. The mouthpiece may be a consumer product for home use or a professional product to be used by a professional, in both cases the user, i.e. the home user or the patient, is the person that receives the illumination from the device.

The mouthpiece is illustrated in different views: a top view in FIG. 1A, a perspective view seen towards the opening in FIG. 1B, a front view in FIG. 1C.

The embodiment of the mouthpiece shown in FIG. 1A comprises first and second light sources 101a-b and first and second lenses 102a-b arranged to project light from the respective first and second light sources 101a-b onto a buccal side 111 of the teeth 110. Thus, the first lens 102a is arranged to receive and project light from the first light source 101a and the second lens 102b is arranged to receive and project light from the second light source 101b. The first light source 101a and first lens 102a may be arranged on one side of the facial midline 120 (e.g. left of the facial midline) and the second light source 101b and the second lens 102b may be arranged on the opposite side of the facial midline 120 (e.g. right of the facial midline).

The facial midline 120 defines a line between the left and right incisors as illustrated. For convenience, the facial midline 120 also defines a center line of the mouthpiece 100 as depicted which is substantially co-linear with the facial midline 120 when the mouthpiece is used and when tolerances of the placement of the mouthpiece is considered. The centerline 120 may be located in the occlusal plane 130, as shown in FIG. 1C. The occlusal plane 130 defines a plane of the mouthpiece which, when the mouthpiece is used, corresponds to the occlusal plane of the teeth.

Other embodiments of the mouthpiece 100 can be configured with other numbers of light sources and lenses. For example, the mouthpiece 100 may have two light sources 101a-b arranged on either side of the facial midline 120 and one lens centered at the facial midline 120 and arranged to receive light from both light sources 101 and to project the light onto the teeth. In another example, the mouthpiece 100 has only one light source and only one lens centered at the facial midline 120 and arranged to receive light project the light onto the teeth 110. Preferred embodiments comprise two or more light sources and associated lenses in order to improve uniform illumination of the left and right sides of the dental arch.

The lenses 102a-b have asymmetrically shaped refraction surfaces shaped to change the intensity distribution of the received light from the light sources 101a-b asymmetrically on opposite sides of an optical axis 121 of the respective light source in an occlusal plane 130 of the of the mouthpiece. For example, the lenses may be shaped to modify the intensity distribution to achieve a uniform intensity distribution along at least a part of the dental arch, e.g. from the second premolar 110e to the lateral incisor 110b.

By change of the intensity distribution is meant that the far field intensity profile of one of the light sources 101a is modified by the associated lens 102a asymmetrically into a different far field intensity distribution. In comparison, a symmetrical lens, such as a spherical or aspherical lens, would modify the intensity distribution symmetrical with respect to the optical axis 121.

The lenses 102a-b may be asymmetrically shaped to modify the intensity distribution so that the intensity of the projected light at the buccal side 111 of the teeth 110 at the facial midline 120 is provided by light from the first and second light sources. Additionally, the lenses may be arranged to shape the projected light so that a part the buccal side 111 of the teeth 110 at a distance away from the facial midline 120 (e.g. teeth on one side of the dental arch such as from the second premolar 110e to the lateral incisor 110b) is illuminated only by light from one of the first and second light sources 101a-b.

In order to provide a uniform intensity over the central incisors 110a, it is necessary that the light from the first and second lenses 102a-b overlap over at least a portion of central incisors 110a. The uniform intensity across the overlap may be achieved by arranging the first and second lenses to project light so that the intensity of the projected light from each one of the first and second light sources gradually decreases along the dental arch towards and beyond the facial midline 120.

Figure 2A:
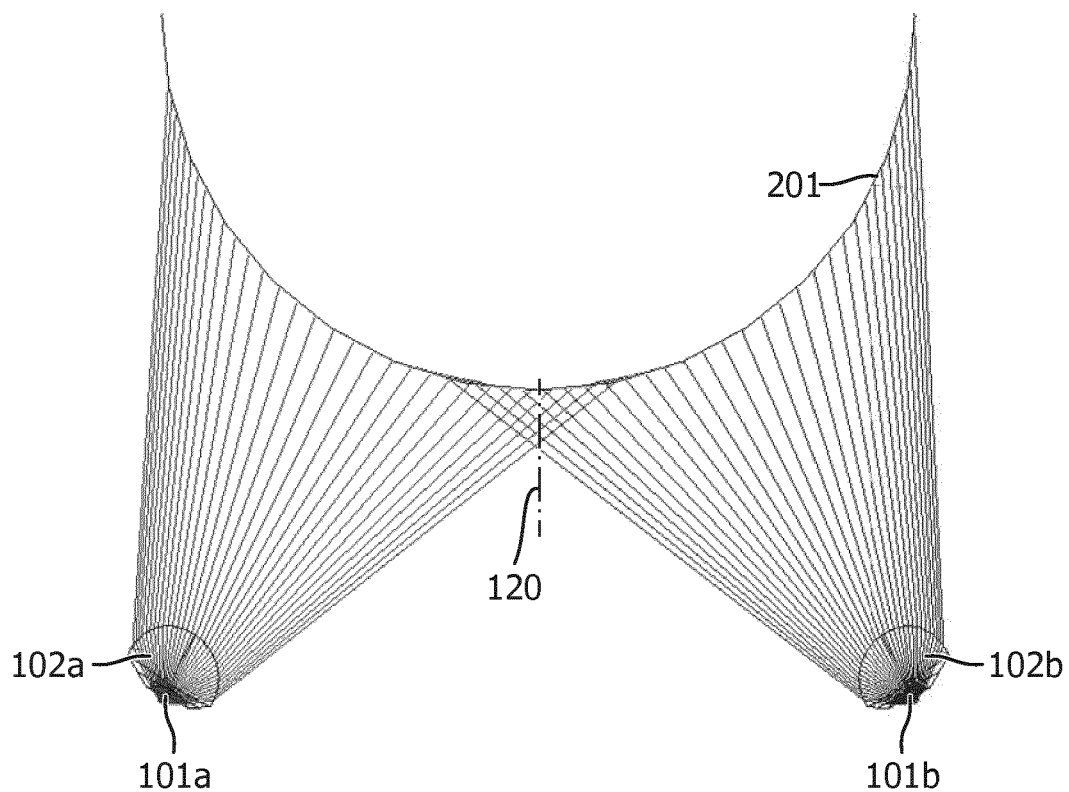
FIG. 2A shows a cross-sectional view of lenses used in the mouthpiece and light rays transmitted by the lenses to the dental arch.

FIG. 2A shows a cross-sectional view of the first and second lenses 102a-b in a plane parallel with the occlusal plane 130. FIG. 2A shows the light rays projected by the lenses onto a part of the dental arch 201 at the teeth 110. As shown light rays from both lenses 102a-b illuminates a part of the dental arch 201 which includes the facial midline. For example, the lenses 102a-b may project light onto both the left and right central incisors 110a. A part of the light rays from the first lens 102a only illuminates a part of the dental arch 201 to the left of the central part of the dental arch illuminated by both light sources 101a-b, and a part of the light rays from the second lens 102b only illuminates a part of the dental arch 201 to the right of the central part of the dental arch.

Figure 2B:
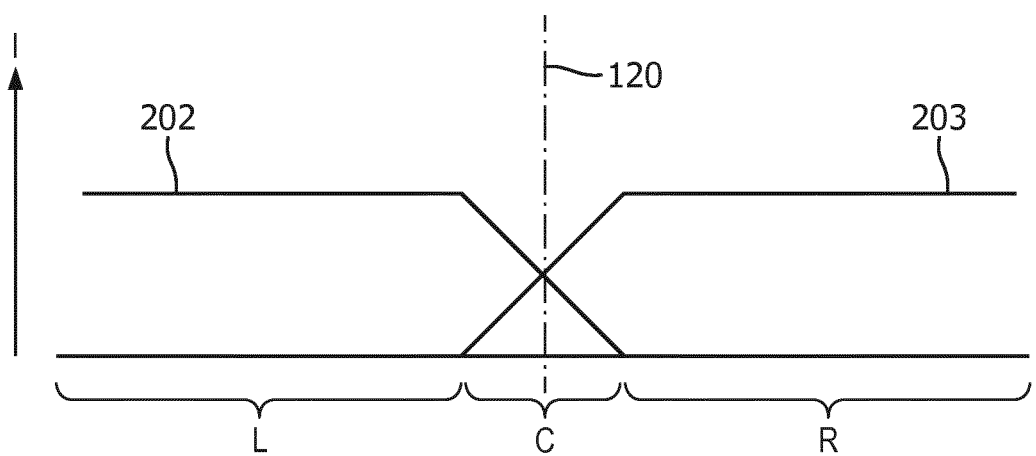
FIG. 2B shows left and right intensity profiles of the light projected by the respective left and right lenses onto the left and right sides of the dental arch.

FIG. 2B shows left and right intensity I profiles 202, 203 of the light projected by the respective left and right lenses 102a-b onto the left (L) and right (R) dental sides. As shown, the intensity I is constant or substantially constant along the dental sides (L, R) away from the central part (C) of the dental arch. Furthermore, the intensity I of projected light from each of the lenses 102a-b gradually decreases from one side of the dental arch across the facial midline 120 to an intensity of zero or substantially zero on the other side of the dental arch a distance away from the facial midline 120. At the central part (C) of the dental arch, the intensities I of the projected light from the two lenses 102a-b add to the same or substantially the same intensity I of projected light on the left and right dental sides.

The lenses may be arranged to change the intensity I over the central part C linearly or according to other profile shapes.

In practice, it may not be possible to achieve a constant intensity I along the left, central and right sides of the dental arch. Therefore, in practice, the intensity may vary along the dental arch, e.g. within a band of +/−10 percent. For teeth whitening applications, the intensity variations should be small enough to avoid clearly visible variations in the whitening effect.

Figure 3:
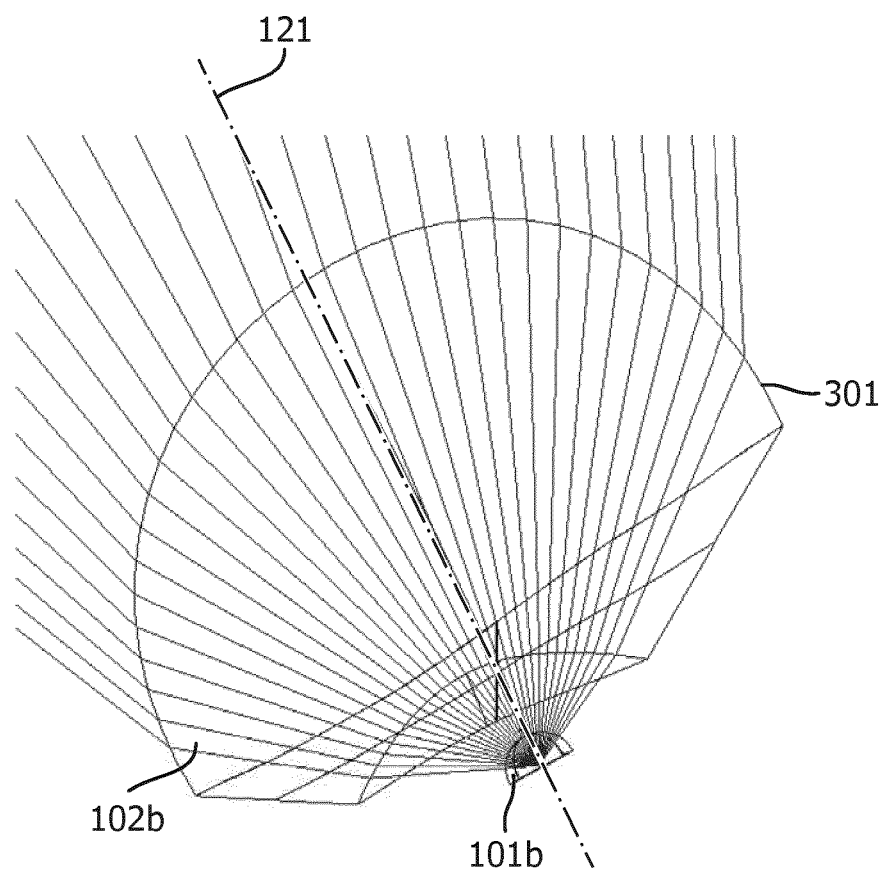
FIG. 3 shows the asymmetrically shaped refraction surface in a cross-sectional view of the lens in a plane parallel with the occlusal plane.

FIG. 3 shows a cross-sectional view of the second light source 101b and the second lens 102b in a plane parallel with the occlusal plane 130. FIG. 3 shows that the lens 102b has an asymmetrically shaped refraction surface 301. In this example, the lens is asymmetrically shaped to so that all light rays received on the right side of the optical axis 121 is bent away from the optical axis in the right direction, whereas some light rays received on the left side of the optical axis 121 is bent towards the optical axis in the right direction. In this way, the asymmetric shaped refraction surface 301 is configured to generate the desired intensity profile 202, 203.

The lenses 102a-b may configured in other ways. For example, each lens may have one or more asymmetrically shaped refraction surfaces. In addition, the input refraction surface of the lens may be asymmetrically shaped instead of the output surface.

Referring again to FIG. 1, the light sources 101a, 101b may be light emitting light sources (LEDs), but other light sources may be used as well. The lenses 102a, 102b are made from a transparent material such as glass, polycarbonate or other plastic material.

The mouthpiece 100 comprises a distance member 109 which is principally illustrated by the dotted line 109 in FIG. 1A. The function of the distance member 109 is to establish a distance between the first and second lenses 102a-b and the buccal side 111 of the teeth 110. The purpose of establishing the distance, which is defined by the distance member, is to ensure that the lenses 102a-b has the correct distance from the teeth. Since the lenses 102a-b are designed to provide the desired intensity profiles 202, 203 when they have a specific location and thereby a specific distance relative to the teeth it is advantageous to configure the mouthpiece 100 with such distance member. The distance member is intended to contact a part of a mouth-region of the user when the mouthpiece is in use. The part of the mouth-region may be the gums, teeth or other.

FIG. 1 shows a distance member 109 in the form of a structure 103 which comprises a bite-bar 131, e.g. in the form of a flat plastic shape, intended to be located between the bite surfaces (occlusal surfaces) of pairs of upper and lower teeth, when the mouthpiece 100 is used. For example, the bite-bar 131 may be intended to be placed between the bite surfaces of the upper and lower second premolars 110e so that well defined distance is established when the distance member 109 is used.

Additionally or alternatively to function as a distance member 109, the structure 103 may embody a holding member 108 which has the function to enable the user to hold the mouthpiece by a force applied to a part of the holding member 108, e.g. to the bite-bar 131, via the occlusal surfaces of one or more of the teeth, i.e. the upper and lower second premolars 110e. The structure 103 is connected to the housing 105, e.g. to the distal end region.

FIG. 1 shows that the mouthpiece 101 comprises a housing 105 with a wall structure. The wall structure may have the shape of a funnel or a tube, e.g. a shape having a proximal end region with an opening circumscribed by a contact part 104 and a distal end region which may be closed or tapered and configured internally to fixate the light sources 101a-b and lenses 102a-b. The contact part 104 is arranged to contact the gums of the user or other mouth-region.

Since the housing 105 together with the contact part 104 establishes a well-defined distance between the first and second lenses 102a-b and the buccal side 111 of the teeth 110 when the contact part 104 is in contact with the mouth-region, the distance member 109 may be embodied by the housing 105 together with the contact part 104. Clearly, the housing 105 functioning as a distance member 109 may be combined with the structure 103 functioning as a holding member 108 and/or a distance member 109.

In general, the distance member 109 is arranged so that the first and second light sources 101a-b and also the first and second lenses 102a-b are located in front of the face of the user when the mouthpiece is used. Accordingly, the mouthpiece 100 is configured with light sources 101a-b located at a specific distance to the mouth-region.

As shown in FIG. 1B, the housing 105 may be configured with at least one through-hole opening 150 arranged in the wall between the contact part 104 and the at least one light source 101a. The holes provides ventilation to the chamber of the mouthpiece 100 so that heat increase due to waste heat from the light sources can be reduced.

The embodiments described in connection with FIG. 1, FIGS. 2A and 2B comprise two light sources and two associated lenses. According to another embodiment, shown in FIG. 6, the mouthpiece may be configured with an additional third light source 101c and a third lens 102c arranged to receive light from the third light source. For example, the third light source 101c and the third lens 102c may be arranged between the first and second lenses 101a and 101b in order to project the light onto the buccal side 111 of the teeth 110. For example, the third light source and the third lens may be arranged on the center line 120 of the mouthpiece and in the same plane as the first and second lenses and light sources 101a-b, 102a-b, e.g. on a plane which is substantially parallel with the occlusal plane 130 when the mouthpiece is used.

The third lens may have a symmetrically shaped refraction surfaces in order to illuminate the center teeth, e.g. the central incisors 110a, symmetrically with respect to the facial midline 120.

According to this embodiment, the first, second and third lenses may be arranged to project light from the first, second and third light sources so that the intensity of the projected light at the buccal side 111 of the teeth 110 from the first and third light sources overlap at a first portion of the dental arch and so that the intensity of the projected light at the buccal side 111 of the teeth 110 from the second and third light sources overlap at a different second portion of the dental arch. For example, light from the first and third light sources may overlap at a range of the dental arch located to the left of the facial midline 120, and light from the first and third light sources may overlap at a range of the dental arch located to the right of the facial midline 120. Preferably, the intensity of light at the overlapping ranges and ranges only illuminated by light from one lens should be substantially constant in the sense described above.

The mouthpiece 100 may comprise a sealing structure which has the function of retaining an applied dental substance within a space defined by the sealing structure and the buccal side 111 of the teeth 110. For example, the dental substance may be in the form of a whitening gel which is applied to the teeth 110 or a surface of the sealing structure.

According to an embodiment the sealing structure comprises the contact part 104. For example, the contact part 104 may constitute a rim, e.g. a closed annular rim, arranged to contact the upper and lower gums and teeth in the transition between the upper and lower gums.

Figure 4:
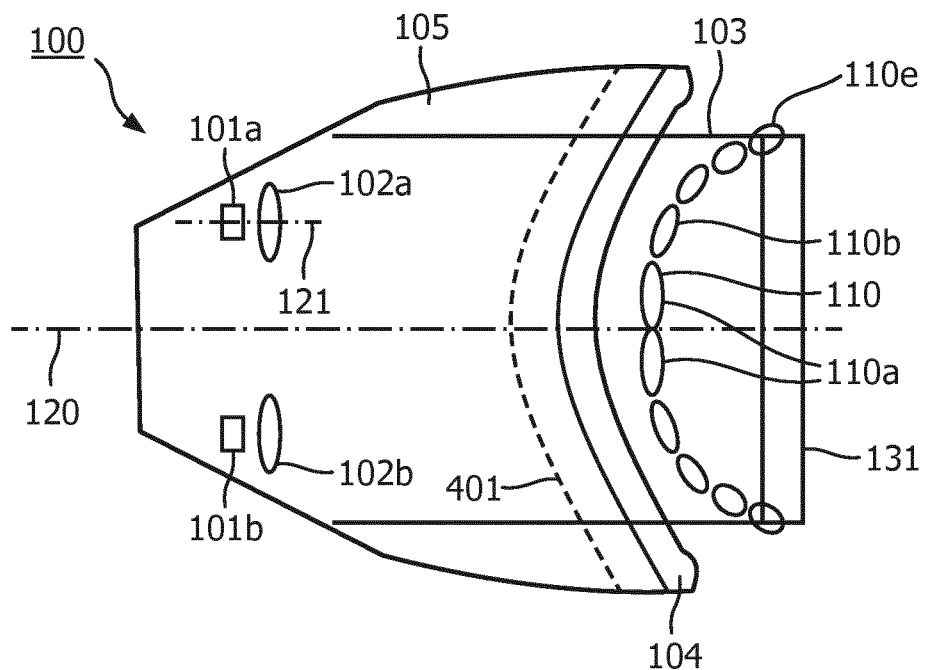
FIG. 4 illustrates an embodiment of the mouthpiece comprising a housing with a solid optically transparent part.

FIG. 4 illustrates an embodiment of the mouthpiece 100 which has features equivalent to the features of the mouthpiece in FIG. 1 as illustrated by the repeated reference numbers. The housing 105 of the mouthpiece in FIG. 4 further comprises a solid optically transparent part 401. The solid optically transparent part 401 is located behind the contact part 104 so that there is a distance between the contact part 104 and the solid optically transparent part 401. The solid optically transparent part is arranged to transmit light from the light sources towards the teeth.

The solid optically transparent part 401 may be in the form of a wall extending between the side walls of the housing, e.g. a wall extending along the dotted line as illustrated. The wall may be thin or may extend e.g. up to the lenses 102a-b. Alternatively, the solid optically transparent part 401 may fill a larger part of the housing 105, e.g. so that the light sources 101a-b and/or the lenses 102a-b is embedded in the solid optically transparent part 401.

The space created by the distance between the contact part 104 and the solid optically transparent part 401 may be used for housing the applied dental substance. Accordingly, the space of the sealing structure may be defined by the optically transparent part 401, the contact part 104, and the buccal side 111 of the teeth 110.

The at least one through-hole 150 shown in FIG. 1B may also be formed in the wall structure of the housing 105 of the mouthpiece in FIG. 4, e.g. in the wall of the housing 105 between the optically transparent part 401 and the light sources 101.

Figure 5:
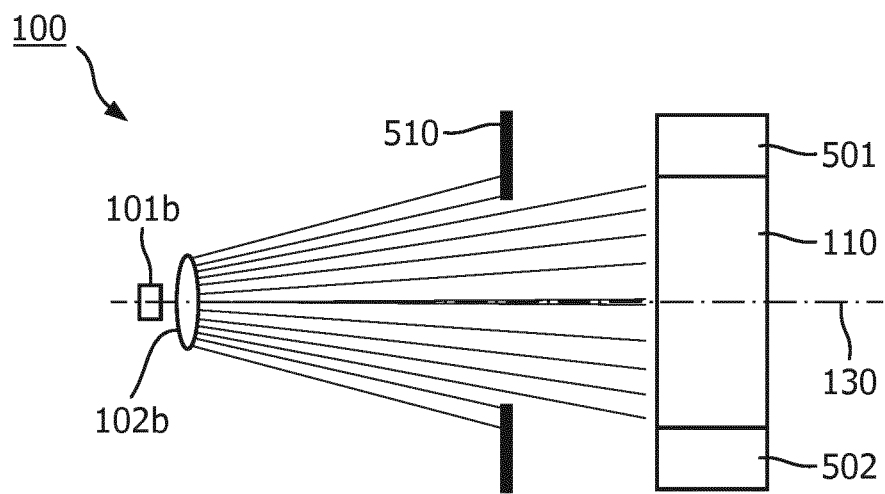
FIG. 5 shows an embodiment of the mouthpiece which comprises an adjustable diaphragm.

FIG. 5 shows an embodiment of the mouthpiece 100 which comprises an adjustable diaphragm 510 in a cross sectional view in a plane perpendicular to the occlusal plane 130. For convenience, not all components of the mouthpiece 100 are shown. The diaphragm 510 is opaque or semi-opaque and prevents rays from contacting the gums of the user 501, 502. The design of the lenses 102a-b may result in that some rays are transmitted at a large angle to the occlusal plane 130 and may therefore cause illumination and heating of the gums. To prevent discomfort associated with heating, rays other than those which will hit the buccal side 111 of the teeth 110 can be blocked. The diaphragm 510 may have a fixed opening, i.e. with a fixed distance between the upper and lower diaphragm parts. Alternatively, the diaphragm 510 may be adjustable to provide an adjustable size of the opening, i.e. an adjustable distance between the upper and lower diaphragm parts. Accordingly, the diaphragm 510 may be arranged to adjust the extension, i.e. the height, of the projected light in a direction perpendicular to the occlusal plane of the mouthpiece. In this way the diaphragm may be fitted according to teeth and gums of individuals.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A mouthpiece for illumination of teeth of a user, the mouthpiece comprises:
    first and second light sources, and
    a first lens arranged to receive light from the first light source and a second lens arranged to receive light from the second light source, where the first and second lenses are arranged to project the received light onto a buccal side of the teeth, and where each of the first and second lenses has an asymmetrically shaped refraction surface shaped to change an intensity distribution of the received light asymmetrically on opposite sides of an optical axis of the respective light source along the dental arch of the teeth.

2. A mouthpiece according to claim 1, further comprising a distance member arranged to contact a part of a mouth-region of the user, when in use, to establish a distance between the first and second lenses and the buccal side of the teeth as defined by the distance member.

3. A mouthpiece according to claim 2, wherein the distance member is arranged so that the first and second light sources are located in front of the face of the user when the mouthpiece is used.

4. A mouthpiece according to claim 1, where the first and second light sources are arranged on either side of a facial midline, when the mouthpiece is used, where the facial midline defines a line between left and right central incisors of the user.

5. A mouthpiece according to claim 4, where the first and second lenses are arranged to project the received light so that the intensity of the projected light at the buccal side of the teeth at the facial midline consist of light from the first and second light sources.

6. A mouthpiece according to claim 4, where the first and second lenses are arranged to project the received light so that a part the buccal side of the teeth a distance away from the facial midline is illuminated only by light from one of the first and second light sources.

7. A mouthpiece according to claim 4, where the first and second lenses are arranged to project the received light so that the intensity of the projected light from each one of the first and second light sources gradually decreases along a dental arch towards the facial midline.

8. A mouthpiece according to claim 1, comprising a third light source and a third lens arranged to receive light from the third light source, where the third light source is arranged between the first and second lenses to project the received light onto the buccal side of the teeth, where the third lens has a symmetrically shaped refraction surface.

9. A mouthpiece according to claim 8, where the first, second and third lenses are arranged to project light from the first, second and third light sources so that the intensity of the projected light at the buccal side of the teeth from the first and third light sources overlap at a first portion of the dental arch and so that the intensity of the projected light at the buccal side of the teeth from the second and third light sources overlap at a different second portion of the dental arch.

10. A mouthpiece according to claim 1, comprising a housing with a wall structure, where an end region of the wall structure comprises a contact part arranged to contact the gums of the user.

11. A mouthpiece according to claim 10, comprising a sealing structure arranged for retaining an applied dental substance within a space defined by the sealing structure and the buccal side of the teeth, where the sealing structure comprises the contact part.

12. A mouthpiece according to claim 10, where the housing comprises at least one through-hole arranged in the wall between the contact part and the at least one light source.

13. A mouthpiece according to claim 10, comprising a holding member connected to the housing, where the holding member is arranged to enable the user to hold the mouthpiece by a force applied to the holding member via an occlusal surface of one or more of the teeth.

14. A mouthpiece according to claim 1, comprising an adjustable diaphragm arranged to adjust an extension of the projected light in a direction perpendicular to the occlusal plane of the mouthpiece.

15. Use of a mouthpiece according to claim 1 for teeth illumination comprising the steps of:
    arranging the mouthpiece so that a part of the mouthpiece contacts a part of a mouth-region of the user to establish a distance as defined by the mouthpiece between the first and second lenses and the buccal side of the teeth, and illuminating the teeth by light projected by the first and second lenses onto the teeth of the user.

\* \* \* \* \*